United States Patent
Banga et al.

(10) Patent No.: US 10,476,869 B2
(45) Date of Patent: Nov. 12, 2019

(54) APPARATUS AND METHOD FOR OBTAINING UP-TO-DATE SECURITY CREDENTIALS

(71) Applicant: General Electric Company, Schenectady, NY (US)

(72) Inventors: Vineet Banga, San Ramon, CA (US); Atul Chandrakant Kshirsagar, San Ramon, CA (US); Leo Chu, San Ramon, CA (US); Sanjeev Chopra, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 147 days.

(21) Appl. No.: 15/651,339

(22) Filed: Jul. 17, 2017

(65) Prior Publication Data

US 2019/0020649 A1   Jan. 17, 2019

(51) Int. Cl.
*G06F 7/04* (2006.01)
*H04L 29/06* (2006.01)
*G06F 21/62* (2013.01)

(52) U.S. Cl.
CPC ...... *H04L 63/0838* (2013.01); *G06F 21/6218* (2013.01); *H04L 63/067* (2013.01); *H04L 2463/082* (2013.01)

(58) Field of Classification Search
None
See application file for complete search history.

(56) References Cited

U.S. PATENT DOCUMENTS

| | | | | |
|---|---|---|---|---|
| 2011/0269423 | A1* | 11/2011 | Schell | H04L 63/062 455/411 |
| 2015/0199530 | A1* | 7/2015 | Thanos | G01D 4/002 713/164 |

* cited by examiner

*Primary Examiner* — Brandon S Hoffman
(74) *Attorney, Agent, or Firm* — Fitch Even Tabin & Flannery LLP (57) ABSTRACT

A credentials database that includes a first credentials locker with a first path defining the location of the first locker, and a second credentials locker. An application program is executed and the application program is a computer program that has direct interaction with a user. A first service program and a second service program are executed, and the first service program and the second service program do not have direct interaction with the user. The first service program is called by the application program, and the second service program is called by the first service program. The first service program uses security credentials to request and obtain data from the second service program, and the second service program. The first service program always has access to and is able to obtain the current credentials.

14 Claims, 3 Drawing Sheets

APPARATUS AND METHOD FOR OBTAINING UP-TO-DATE SECURITY CREDENTIALS

BACKGROUND OF THE INVENTION

Field of the Invention

The subject matter disclosed herein generally relates to security credentials and, more specifically, to being able to obtain up-to-date credentials that allow a computer program to have uninterrupted access to data.

Brief Description of the Related Art

Industrial equipment or assets, generally, are engineered to perform particular tasks as part of a business process. For example, industrial assets can include, among other things and without limitation, manufacturing equipment on a production line, wind turbines that generate electricity on a wind farm, healthcare or imaging devices (e.g., X-ray or MRI systems) for use in patient care facilities, or drilling equipment for use in mining operations. The design and implementation of these assets often takes into account both the physics of the task at hand, as well as the environment in which such assets are configured to operate.

Low-level software and hardware-based controllers have long been used to drive industrial assets. However, the rise of inexpensive cloud computing, increasing sensor capabilities, and decreasing sensor costs, as well as the proliferation of mobile technologies have created opportunities for creating novel industrial assets with improved sensing technology that are capable of transmitting data that can then be transmitted to a network. As a consequence, there are new opportunities to enhance the business value of some industrial assets using novel industrial-focused hardware and software.

Security is also a concern in these types of systems. Application programs often run background service programs that access data. However, to access the data, proper security credentials are required. Unfortunately, these credentials change over time. In previous systems, this changing or updating of credentials required the re-wiring or re-programming of various elements of the system to obtain the updated and correct credentials, resulting in system down-time and inefficiencies in system operation.

BRIEF DESCRIPTION OF THE INVENTION

The present invention is directed to approaches for allowing programs the ability to continuously access data even though security credentials involving the accessing of the data change or are otherwise updated.

In many of these embodiments, a system for maintaining access to correct security credentials includes a credentials database, a control circuit, an applications program, a first service program, and a second service program. The credentials database includes a first credentials locker (with a first path or address defining the location of the first locker), and a second credentials locker.

The application program is executed by the control circuit and is a computer program that has direct interaction with a user. A first service program, a second service program, and a credentials control program are executed by the control circuit. The first service program and the second service program do not have a direct interaction with the user.

The application program calls the first service program, and the first service program calls the second service program. The first service program uses security credentials to request and obtain data from the second service program. The second service program, upon presentation of correct security credentials from the first service program, grants the first service program access to the data.

The application program requests and the credentials control program creates a one-time authentication code, and the application program stores the one-time authentication code and the credentials in the second credentials locker. The application program requests and the credentials control program creates a two-time authentication code. The application program uses the two-time authentication code to write the first path and the one-time authentication code to the second credentials locker. The application program passes the second path and the two-time authentication code to the first service program, and the first service program uses the two-time authentication code to obtain the first path and the one-time authentication code from the second credentials locker. The first service program subsequently uses the one-time authentication code to request permission from the control circuit to permanently access the first credentials locker and obtains the credentials, such that as the credentials change, the first service program will always have access to and be able to obtain the current and up-to-date credentials.

In aspects, an encryption service is executed by the credentials control program and generates the one-time authentication code and the two-time authentication code. In other aspects, the application program passes the two-time authentication code to the first service program as part of a create service argument or an update service argument.

In examples, the credentials control program destroys the two-time authentication code after returning the first path and the one-time authentication code to the first service program. In other examples, the credentials control program marks the one-time authentication code as used after the first service program requests permanent access to the first credentials locker.

In aspects, the credentials in the first credentials locker are subsequently changed. In other aspects, the first service program subsequently uses its own authentication code to obtain the credentials from the first credentials locker.

In others of these embodiments, a credentials database that includes a first credentials locker with a first path defining the location of the first locker, and a second credentials locker. An application program is executed and the application program is a computer program that has direct interaction with a user.

A first service program and a second service program are executed, and the first service program and the second service program do not have direct interaction with the user.

The first service program is called by the application program, and the second service program is called by the first service program. The first service program uses security credentials to request and obtain data from the second service program, and the second service program. Upon presentation of correct security credentials from the first service program, the first service program is granted access to the data.

The application program requests and a credentials control program creates a one-time authentication code. The application program stores the one-time authentication code and the credentials in the second credentials locker.

The application program requests and the credentials control program creates a two-time authentication code. The application program uses the two-time authentication code to write the first path and the one-time authentication code to the second credentials locker.

The application program passes the second path and the two-time authentication code to the first service program, and the first service program uses the two-time authentication code to obtain the first path and the one-time authentication code from the second credentials locker.

The first service program subsequently uses the one-time authentication code to request permission from the control circuit to permanently access the first credentials locker and obtains the credentials, such that as the credentials change, the first service program will always have access to and be able to obtain the current credentials.

BRIEF DESCRIPTION OF THE DRAWINGS

For a more complete understanding of the disclosure, reference should be made to the following detailed description and accompanying drawings wherein.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE INVENTION

In the present approaches, the ability of a computer program to continuously access data is provided. More specifically, even though security credentials that are required to access the data may change, access to the data is seamlessly and permanently maintained.

Figure 1:
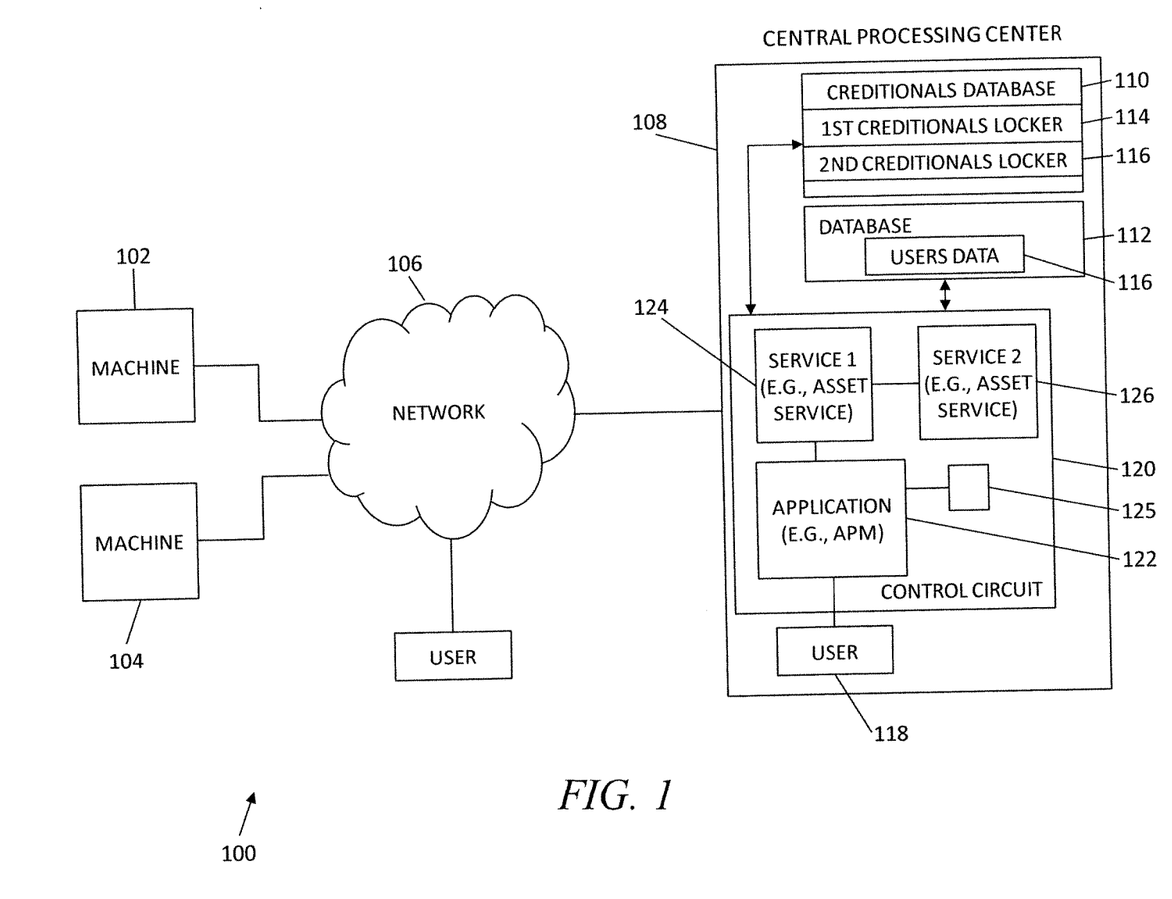
FIG. 1 comprises a block diagram of a system of managing security credentials according to various embodiments of the present invention.

Referring now to FIG. 1, one example of a system 100 that utilizes the security features described herein is described. The system 100 includes industrial machines 102 and 104, a network 106, and a central processing center 108.

The industrial machines 102 and 104 may be any type of industrial machines such as manufacturing equipment on a production line, wind turbines that generate electricity on a wind farm, healthcare or imaging devices (e.g., X-ray or MRI systems) for use in patient care facilities, or drilling equipment for use in mining operations. Other examples are possible.

The network 106 is any type of communication network or combination of networks. The network 106 may include devices such as gateways, routers, and processors to mention a few examples. In examples, the network 106 may be the cloud or the internet.

The central processing center 108 includes a credentials database 110 and a user database 112. Although shown separately here, it will be understood that the databases 110 and 112 may be included at or be disposed in the same physical device or memory. The credentials database 110 includes a first credentials locker 114 and a second credentials locker 116. The user database 112 includes user data 116 that belongs to a user 118.

The first credentials locker 114 and the second credentials locker 116 are data structures or memory locations that store various types of information. In aspects, access to (e.g., the ability to write information to or read information from) the first credentials locker 114 and second credentials locker 116 is controlled. For example, a code, key, token, or password may be required to access the first credentials locker 114 and second credentials locker 116.

The central processing center 108 also includes a control circuit 120. The control circuit 120 executes an application program 122 (e.g., the APM Service offered by General Electric Company). The application program 122 utilizes a first service program 124 (e.g., the Asset Service that is also offered by General Electric Company) and a second service program 126 (e.g., the ACS service also offered by General Electric Company). The control circuit executes a credentials control program 125.

Generally speaking, the application program 122 is accessed by and interacts with a user. The first service program 124 and the second service program 126 are executed in the background and do not directly interact with the user. In this example, the first service program 124 interacts with the application program and the second service program 126 interacts with the first service program 124. More specifically, the second service program 126 provides data 116 (or allows access to the data 116) by the first service program 124. In order to access this data, the first service program 124 must present correct and valid credentials (e.g., a code, key or password) to the second service program 126.

As mentioned, the user 118 interacts with the application program 122. The user's data 116 is needed by the first service program 124, which obtains the data 116 via the second service 126. To obtain the data 116, the first service 124 offers credentials to the second service 126.

In the approaches described herein, the first service 124 receives permanent access privileges to obtain current and up-to-date credentials (even as these credentials may be changed over time). Thus, the first service 124 can always access the data 116, and this is accomplished without re-programming or re-wiring any of the components of the system 100.

Figure 2:
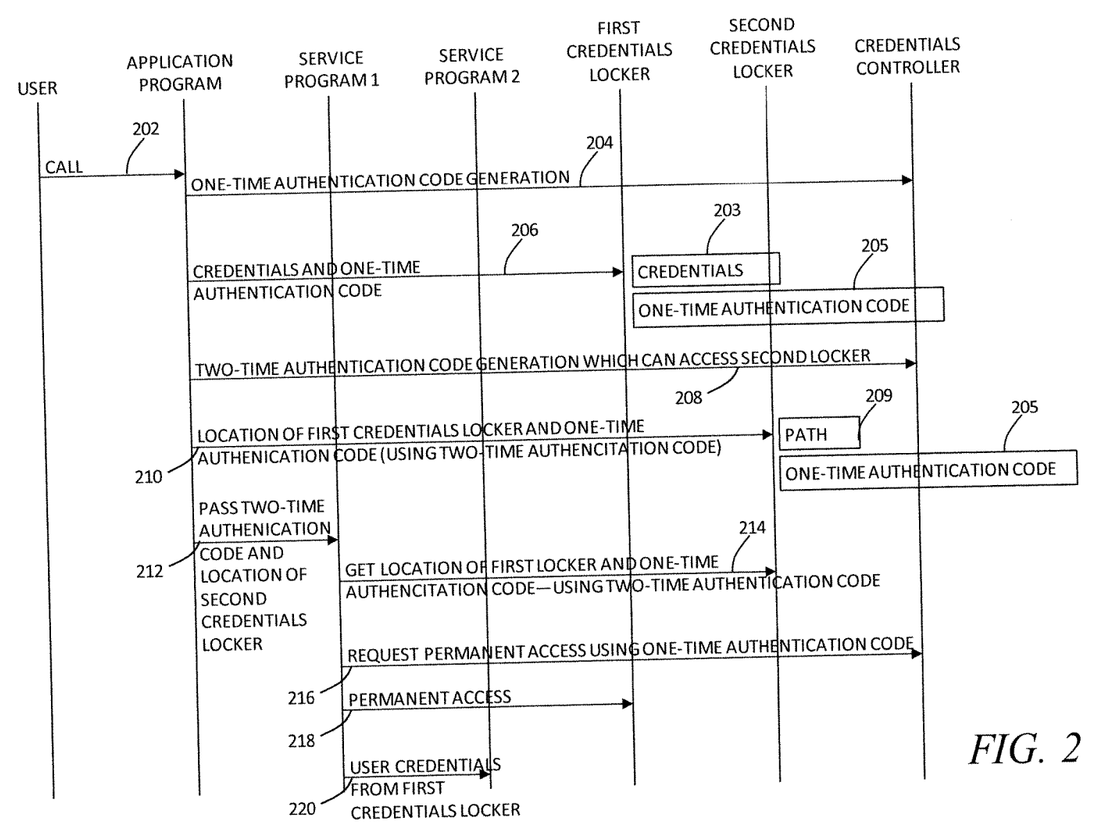
FIG. 2 comprises a flowchart of a system of managing security credentials according to various embodiments of the present invention.

Referring now to FIG. 2, one example of an approach that allows computer programs access of up-to-date credentials is described. A user interacts with an application program, which utilizes a first service program (service program 1) and a second service program (service program 2). A credentials database includes a first credentials locker and a second credentials locker. A credentials control program (e.g., executed at a control circuit) may grant access privileges to the lockers.

At step 202, a user interacts with the application program. For example, the user may cause the application program to be executed. The application program may serve any purpose and provide any functions for a user.

At step 204, the application program sends a one-time-authentication code and credentials to the credentials control program. The authorization code may be of any type of format (e.g., a binary value). The credentials may be any security-related information allowing a service program to gain access to data. For example, the credentials may be a password, key, or code (or combinations of these or other elements to mention a few examples).

At step 206, the one-time-authentication code 203 and credentials 205 are stored in the first credentials locker. At step 208, the application program requests that the credentials control program create a two-time authentication code that is stored at the second credentials locker. The two-time authentication code may be of any format (e.g., a binary value).

In aspects, an encryption service is executed by the credentials control program and generates the one-time authentication code and the two-time authentication code. In other aspects, the application program passes the two-time authentication code to the first service program as part of a create service argument (or command) or an update service argument (or command).

At step 210, the applications program sends the location of the first credentials locker (path) 209 and the one-time authentication code 205 to the second credentials locker. At step 212, the application program passes the two-time authentication code and the location of the second credentials locker to the first service program. The path may specific the location in memory of the first credentials locker.

At step 214, the first service program obtains or gets the location of the first credentials locker and the one-time authentication code using the two-time authentication code to access the second credentials locker. At step 216, the first service program requests permanent access to the first credentials locker from the credentials control program using the one-time authentication code. The credentials control program grants the access request.

At step 218, permanent access of the first service program is used to allow the first service program credentials 203. At step 220, the credentials 203 are used by the first service program to present to the second service program (and data used or obtained by the second service program).

In examples, the credentials control program destroys the two-time authentication code after returning the first path and the one-time authentication code to the first service program. In yet other examples, the credentials control program marks the one-time authentication code as used after the first service program requests permanent access to the first credentials locker. The marking can be made according to any marking or programming approach. For example, a flag may be set.

It will be appreciated that the first service program has access to the first credentials locker and the credentials that are stored in this locker. Changes to the credentials are made (e.g., by a supervisor or a customer), but the first service program continues to have access to the first credentials locker. Since the first service program has permanent access to the locker, the first service program has up-to-date credentials and can obtain user data via the second service program.

Figure 3:
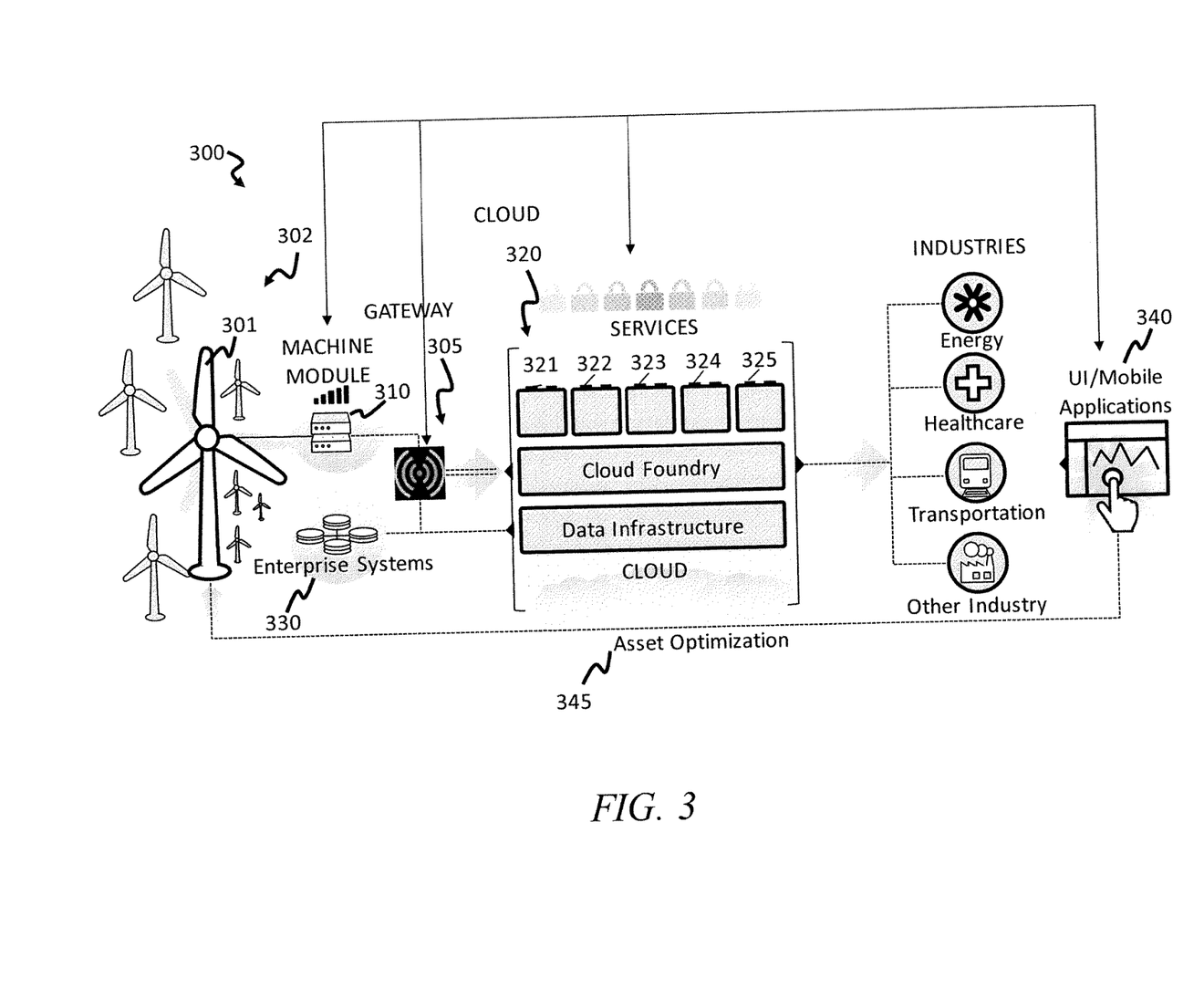
FIG. 3 comprises a block diagram of a system according to various embodiments of the present invention.

FIG. 3 is a description of the Predix™ platform. While progress with industrial equipment automation has been made over the last several decades, and assets have become 'smarter,' the intelligence of any individual asset pales in comparison to intelligence that can be gained when multiple smart devices are connected together. Aggregating data collected from or about multiple assets can enable users to improve business processes, for example by improving effectiveness of asset maintenance or improving operational performance if appropriate industrial-specific data collection and modeling technology is developed and applied. It will be appreciated that the approaches described with respect to FIG. 1 and FIG. 2 can also be implemented by a security module within the system of FIG. 3.

In an example, an industrial asset can be outfitted with one or more sensors configured to monitor respective ones of an asset's operations or conditions. Data from the one or more sensors can be recorded or transmitted to a cloud-based or other remote computing environment. By bringing such data into a cloud-based computing environment, new software applications informed by industrial process, tools and know-how can be constructed, and new physics-based analytics specific to an industrial environment can be created. Insights gained through analysis of such data can lead to enhanced asset designs, or to enhanced software algorithms for operating the same or similar asset at its edge, that is, at the extremes of its expected or available operating conditions.

The systems and methods for managing industrial assets can include or can be a portion of an Industrial Internet of Things (IIoT). In an example, an IIoT connects industrial assets, such as turbines, jet engines, and locomotives, to the Internet or cloud, or to each other in some meaningful way. The systems and methods described herein can include using a "cloud" or remote or distributed computing resource or service. The cloud can be used to receive, relay, transmit, store, analyze, or otherwise process information for or about one or more industrial assets. In an example, a cloud computing system includes at least one processor circuit, at least one database, and a plurality of users or assets that are in data communication with the cloud computing system. The cloud computing system can further include or can be coupled with one or more other processor circuits or modules configured to perform a specific task, such as to perform tasks related to asset maintenance, analytics, data storage, security, or some other function.

However, the integration of industrial assets with the remote computing resources to enable the IIoT often presents technical challenges separate and distinct from the specific industry and from computer networks, generally. A given industrial asset may need to be configured with novel interfaces and communication protocols to send and receive data to and from distributed computing resources. Given industrial assets may have strict requirements for cost, weight, security, performance, signal interference, and the like such that enabling such an interface is rarely as simple as combining the industrial asset with a general-purpose computing device.

To address these problems and other problems resulting from the intersection of certain industrial fields and the IIoT, embodiments may enable improved interfaces, techniques, protocols, and algorithms for facilitating communication with and configuration of industrial assets via remote computing platforms and frameworks. Improvements in this regard may relate to both improvements that address particular challenges related to particular industrial assets (e.g., improved aircraft engines, wind turbines, locomotives, medical imaging equipment) that address particular problems related to use of these industrial assets with these remote computing platforms and frameworks, and also improvements that address challenges related to operation of the platform itself to provide improved mechanisms for configuration, analytics, and remote management of industrial assets.

The Predix™ platform available from GE is a novel embodiment of such Asset Management Platform (AMP) technology enabled by state of the art cutting edge tools and cloud computing techniques that enable incorporation of a manufacturer's asset knowledge with a set of development tools and best practices that enables asset users to bridge gaps between software and operations to enhance capabilities, foster innovation, and ultimately provide economic value. Through the use of such a system, a manufacturer of industrial assets can be uniquely situated to leverage its understanding of industrial assets themselves, models of such assets, and industrial operations or applications of such assets, to create new value for industrial customers through asset insights.

FIG. 3 illustrates generally an example of portions of a first AMP 300. As further described herein, one or more portions of an AMP can reside in an asset cloud computing system 320, in a local or sandboxed environment, or can be distributed across multiple locations or devices. An AMP can be configured to perform any one or more of data acquisition, data analysis, or data exchange with local or remote assets, or with other task-specific processing devices.

The first AMP 300 includes a first asset community 302 that is communicatively coupled with the asset cloud computing system 320. In an example, a machine module 310 receives information from, or senses information about, at least one asset member of the first asset community 302, and configures the received information for exchange with the asset cloud computing system 320. In an example, the machine module 310 is coupled to the asset cloud computing system 320 or to an enterprise computing system 330 via a communication gateway 105.

In an example, the communication gateway 305 includes or uses a wired or wireless communication channel that extends at least from the machine module 310 to the asset cloud computing system 320. The asset cloud computing system 320 includes several layers. In an example, the asset cloud computing system 320 includes at least a data infrastructure layer, a cloud foundry layer, and modules for providing various functions. In the example of FIG. 3, the asset cloud computing system 320 includes an asset module 321, an analytics module 322, a data acquisition module 323, a data security module 324, and an operations module 325. Each of the modules 321-325 includes or uses a dedicated circuit, or instructions for operating a general-purpose processor circuit, to perform the respective functions. In an example, the modules 321-325 are communicatively coupled in the asset cloud computing system 320 such that information from one module can be shared with another. In an example, the modules 321-325 are co-located at a designated datacenter or other facility, or the modules 321-325 can be distributed across multiple different locations.

An interface device 340 can be configured for data communication with one or more of the machine module 310, the gateway 305, or the asset cloud computing system 320. The interface device 340 can be used to monitor or control one or more assets. In an example, information about the first asset community 302 is presented to an operator at the interface device 340. The information about the first asset community 302 can include information from the machine module 310, or the information can include information from the asset cloud computing system 320. In an example, the information from the asset cloud computing system 320 includes information about the first asset community 302 in the context of multiple other similar or dissimilar assets, and the interface device 340 can include options for optimizing one or more members of the first asset community 302 based on analytics performed at the asset cloud computing system 320.

In an example, an operator selects a parameter update for the first wind turbine 301 using the interface device 340, and the parameter update is pushed to the first wind turbine via one or more of the asset cloud computing system 320, the gateway 305, and the machine module 310. In an example, the interface device 340 is in data communication with the enterprise computing system 330 and the interface device 340 provides an operation with enterprise-wide data about the first asset community 302 in the context of other business or process data. For example, choices with respect to asset optimization can be presented to an operator in the context of available or forecasted raw material supplies or fuel costs. In an example, choices with respect to asset optimization can be presented to an operator in the context of a process flow to identify how efficiency gains or losses at one asset can impact other assets. In an example, one or more choices described herein as being presented to a user or operator can alternatively be made automatically by a processor circuit according to earlier-specified or programmed operational parameters. In an example, the processor circuit can be located at one or more of the interface device 340, the asset cloud computing system 320, the enterprise computing system 330, or elsewhere.

Returning again to the example of FIG. 3 some capabilities of the first AMP 300 are illustrated. The example of FIG. 3 includes the first asset community 302 with multiple wind turbine assets, including the first wind turbine 301. Wind turbines are used in some examples herein as non-limiting examples of a type of industrial asset that can be a part of, or in data communication with, the first AMP 300.

In an example, the multiple turbine members of the asset community 302 include assets from different manufacturers or vintages. The multiple turbine members of the asset community 302 can belong to one or more different asset communities, and the asset communities can be located locally or remotely from one another. For example, the members of the asset community 302 can be co-located on a single wind farm, or the members can be geographically distributed across multiple different farms. In an example, the multiple turbine members of the asset community 302 can be in use (or non-use) under similar or dissimilar environmental conditions, or can have one or more other common or distinguishing characteristics.

FIG. 3 further includes the device gateway 305 configured to couple the first asset community 302 to the asset cloud computing system 320. The device gateway 305 can further couple the asset cloud computing system 320 to one or more other assets or asset communities, to the enterprise computing system 330, or to one or more other devices. The first AMP 300 thus represents a scalable industrial solution that extends from a physical or virtual asset (e.g., the first wind turbine 301) to a remote asset cloud computing system 320. The asset cloud computing system 320 optionally includes a local, system, enterprise, or global computing infrastructure that can be optimized for industrial data workloads, secure data communication, and compliance with regulatory requirements.

In an example, information from an asset, about the asset, or sensed by an asset itself is communicated from the asset to the data acquisition module 324 in the asset cloud computing system 320. In an example, an external sensor can be used to sense information about a function of an asset, or to sense information about an environment condition at or near an asset. The external sensor can be configured for data communication with the device gateway 305 and the data acquisition module 324, and the asset cloud computing system 320 can be configured to use the sensor information in its analysis of one or more assets, such as using the analytics module 322.

In an example, the first AMP 300 can use the asset cloud computing system 320 to retrieve an operational model for the first wind turbine 301, such as using the asset module 321. The model can be stored locally in the asset cloud computing system 320, or the model can be stored at the enterprise computing system 330, or the model can be stored elsewhere. The asset cloud computing system 320 can use the analytics module 322 to apply information received about the first wind turbine 301 or its operating conditions (e.g., received via the device gateway 305) to or with the retrieved operational model. Using a result from the analytics module 322, the operational model can optionally be updated, such as for subsequent use in optimizing the first wind turbine 301 or one or more other assets, such as one or more assets in the same or different asset community. For example, information about the first wind turbine 301 can be analyzed at the asset cloud computing system 320 to inform selection of an operating parameter for a remotely located second wind turbine that belongs to a different second asset community.

The first AMP 300 includes a machine module 310. The machine module 310 includes a software layer configured for communication with one or more industrial assets and the asset cloud computing system 320. In an example, the machine module 310 can be configured to run an application locally at an asset, such as at the first wind turbine 301. The machine module 310 can be configured for use with or installed on gateways, industrial controllers, sensors, and other components. In an example, the machine module 310 includes a hardware circuit with a processor that is configured to execute software instructions to receive information about an asset, optionally process or apply the received information, and then selectively transmit the same or different information to the asset cloud computing system 320.

In an example, the asset cloud computing system 320 can include the operations module 325. The operations module 325 can include services that developers can use to build or test Industrial Internet applications, or the operations module 325 can include services to implement Industrial Internet applications, such as in coordination with one or more other AMP modules. In an example, the operations module 325 includes a microservices marketplace where developers can publish their services and/or retrieve services from third parties. The operations module 325 can include a development framework for communicating with various available services or modules. The development framework can offer developers a consistent look and feel and a contextual user experience in web or mobile applications.

In an example, an AMP can further include a connectivity module. The connectivity module can optionally be used where a direct connection to the cloud is unavailable. For example, a connectivity module can be used to enable data communication between one or more assets and the cloud using a virtual network of wired (e.g., fixed-line electrical, optical, or other) or wireless (e.g., cellular, satellite, or other) communication channels. In an example, a connectivity module forms at least a portion of the gateway 305 between the machine module 310 and the asset cloud computing system 320.

In an example, an AMP can be configured to aid in optimizing operations or preparing or executing predictive maintenance for industrial assets. An AMP can leverage multiple platform components to predict problem conditions and conduct preventative maintenance, thereby reducing unplanned downtimes. In an example, the machine module 310 is configured to receive or monitor data collected from one or more asset sensors and, using physics-based analytics (e.g., finite element analysis or some other technique selected in accordance with the asset being analyzed), detect error conditions based on a model of the corresponding asset. In an example, a processor circuit applies analytics or algorithms at the machine module 310 or at the asset cloud computing system 320.

In response to the detected error conditions, the AMP can issue various mitigating commands to the asset, such as via the machine module 310, for manual or automatic implementation at the asset. In an example, the AMP can provide a shut-down command to the asset in response to a detected error condition. Shutting down an asset before an error condition becomes fatal can help to mitigate potential losses or to reduce damage to the asset or its surroundings. In addition to such an edge-level application, the machine module 310 can communicate asset information to the asset cloud computing system 320.

In an example, the asset cloud computing system 320 can store or retrieve operational data for multiple similar assets. Over time, data scientists or machine learning can identify patterns and, based on the patterns, can create improved physics-based analytical models for identifying or mitigating issues at a particular asset or asset type. The improved analytics can be pushed back to all or a subset of the assets, such as via multiple respective machine modules 310, to effectively and efficiently improve performance of designated (e.g., similarly-situated) assets.

In an example, the asset cloud computing system 320 includes a Software-Defined Infrastructure (SDI) that serves as an abstraction layer above any specified hardware, such as to enable a data center to evolve over time with minimal disruption to overlying applications. The SDI enables a shared infrastructure with policy-based provisioning to facilitate dynamic automation, and enables SLA mappings to underlying infrastructure. This configuration can be useful when an application requires an underlying hardware configuration. The provisioning management and pooling of resources can be done at a granular level, thus allowing optimal resource allocation.

In a further example, the asset cloud computing system 320 is based on Cloud Foundry (CF), an open source PaaS that supports multiple developer frameworks and an ecosystem of application services. Cloud Foundry can make it faster and easier for application developers to build, test, deploy, and scale applications. Developers thus gain access to the vibrant CF ecosystem and an ever-growing library of CF services. Additionally, because it is open source, CF can be customized for IIoT workloads.

The asset cloud computing system 320 can include a data services module that can facilitate application development. For example, the data services module can enable developers to bring data into the asset cloud computing system 320 and to make such data available for various applications, such as applications that execute at the cloud, at a machine module, or at an asset or other location. In an example, the data services module can be configured to cleanse, merge, or map data before ultimately storing it in an appropriate data store, for example, at the asset cloud computing system 320. A special emphasis has been placed on time series data, as it is the data format that most sensors use.

Security can be a concern for data services that deal in data exchange between the asset cloud computing system 320 and one or more assets or other components. Some options for securing data transmissions include using Virtual Private Networks (VPN) or an SSL/TLS model. In an example, the first AMP 300 can support two-way TLS, such as between a machine module and the security module 324. In an example, two-way TLS may not be supported, and the security module 324 can treat client devices as OAuth users. For example, the security module 324 can allow enrollment of an asset (or other device) as an OAuth client and transparently use OAuth access tokens to send data to protected endpoints. The approaches described with respect to FIG. 1 and FIG. 2 can also be implemented by the security module 324.

It will be appreciated by those skilled in the art that modifications to the foregoing embodiments may be made in various aspects. Other variations clearly would also work, and are within the scope and spirit of the invention. It is deemed that the spirit and scope of the invention encompasses such modifications and alterations to the embodiments herein as would be apparent to one of ordinary skill in the art and familiar with the teachings of the present application.

What is claimed is:

1. A system for maintaining access to correct security credentials, the system comprising:
    a credentials database that includes a first credentials locker with a first path defining the location of the first locker, and a second credentials locker, wherein the first credentials locker and the second credentials locker are separate from each other, each of the first credentials locker and the second credentials locker having controlled access;
    a control circuit that executes a credentials control program;
    an application program that is executed by the control circuit, the application program being a computer program that has direct interaction with a user;
    a first service program and a second service program being executed by the control circuit, the first service program and the second service program not having direct interaction with the user and being executed as background tasks;
    wherein the application program calls the first service program, the first service program calls the second service program, the first service program using security credentials to request and obtain data from the second service program, wherein the second service program, upon presentation of correct security credentials from the first service program, grants the first service program access to the data, wherein the security credentials are one or more of a code, key, token, or password;
    wherein the application program requests and the credentials control program creates a one-time authentication code, and wherein the application program stores the one-time authentication code and the credentials in the first credentials locker;
    wherein the application program requests and the credentials control program creates a two-time authentication code;
    wherein the application program uses the two-time authentication code to write the first path and the one-time authentication code to the second credentials locker;
    wherein application program passes the second path and the two-time authentication code to the first service program, and wherein the first service program uses the two-time authentication code to obtain the first path and the one-time authentication code from the first credentials locker;
    wherein the first service program subsequently uses the one-time authentication code to request permission from the credentials control program to permanently access the first credentials locker and obtains the credentials, such that as the credentials change, the first service program will always have access to the first credentials locker and be able to obtain the current credentials in the first credentials locker.

2. The system of claim 1, wherein an encryption service being executed by the credentials control program generates the one-time authentication code and the two-time authentication code.

3. The system of claim 1, wherein the application program passes the two-time authentication code to the first service program as part of a create service argument or an update service argument.

4. The system of claim 1, wherein the credentials control program destroys the two-time authentication code after returning the first path and the one-time authentication code to the first service program.

5. The system of claim 1, wherein the credentials control program marks the one-time authentication code as used after the first service program requests permanent access to the first credentials locker.

6. The system of claim 1, wherein the credentials in the first credentials locker are subsequently changed.

7. The system of claim 1, wherein the first service program subsequently uses its own authentication code to obtain the credentials from the first credentials locker.

8. A method for maintaining access to correct security credentials, the method comprising:
    maintaining a credentials database that includes a first credentials locker with a first path defining the location of the first locker, and a second credentials locker, wherein the first credentials locker and the second credentials locker are separate from each other, each of the first credentials locker and the second credentials locker having controlled access;
    executing an application program, the application program being a computer program that has direct interaction with a user;
    executing a credentials control program;
    executing a first service program and a second service program, the first service program and the second service program not having direct interaction with the user and being executed as background tasks;
    calling the first service program by the application program, and calling the second service program by the first service program, wherein the first service program uses security credentials to request and obtain data from the second service program, and wherein the second service program, upon presentation of correct security credentials from the first service program, grants the first service program access to the data, wherein the security credentials are one or more of a code, key, token, or password;
    requesting by the application program and creating by the credentials control program a one-time authentication code, and wherein the application program stores the one-time authentication code and the credentials in the first credentials locker;
    requesting by the application program and creating by the credentials control program a two-time authentication code, and wherein the application program uses the two-time authentication code to write the first path and the one-time authentication code to the second credentials locker;
    passing by the application program the second path and the two-time authentication code to the first service program, and wherein the first service program uses the two-time authentication code to obtain the first path and the one-time authentication code from the first credentials locker;

wherein the first service program subsequently uses the one-time authentication code to request permission from the credentials control program to permanently access the first credentials locker and obtains the credentials, such that as the credentials change, the first service program will always have access to the first credentials locker and be able to obtain the current credentials in the first credentials locker.

9. The method of claim 8, further comprising executing an encryption service by the credentials control program to generate the one-time authentication code and the two-time authentication code.

10. The method of claim 8, wherein the application program passes the two-time authentication code to the first service program as part of a create service argument or an update service argument.

11. The method of claim 8, further comprising destroying the two-time authentication code after the first path and the one-time authentication code are returned to the first service program.

12. The method of claim 8, further comprising marking the one-time authentication code as used after the first service program requests permanent access to the first credentials locker.

13. The method of claim 8, wherein the credentials in the first credentials locker are subsequently changed.

14. The method of claim 8, wherein the first service program subsequently uses its own authentication code to obtain the credentials from the first credentials locker.

* * * * *